United States Patent Office 3,213,288
Patented Oct. 19, 1965

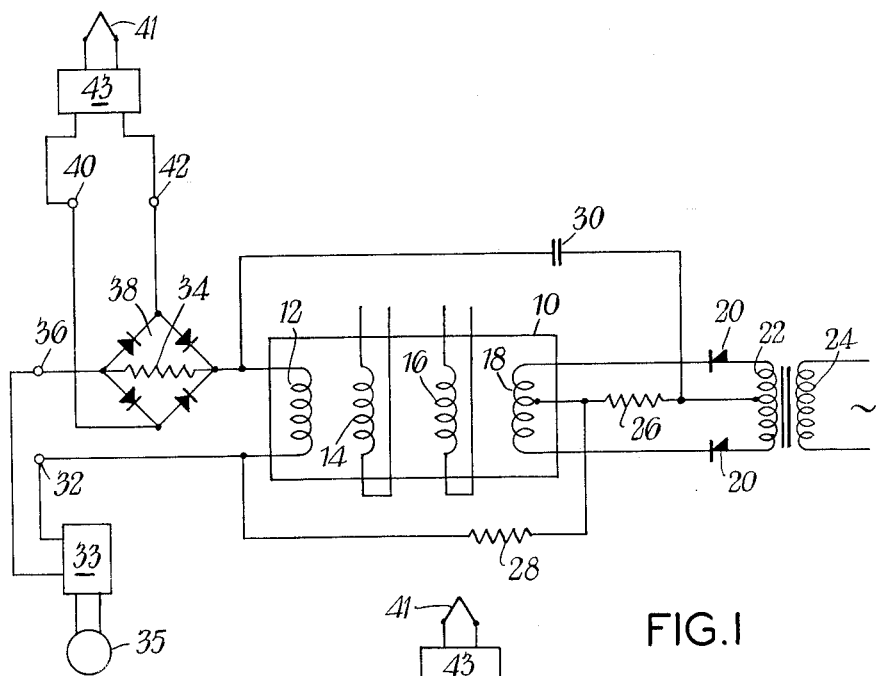
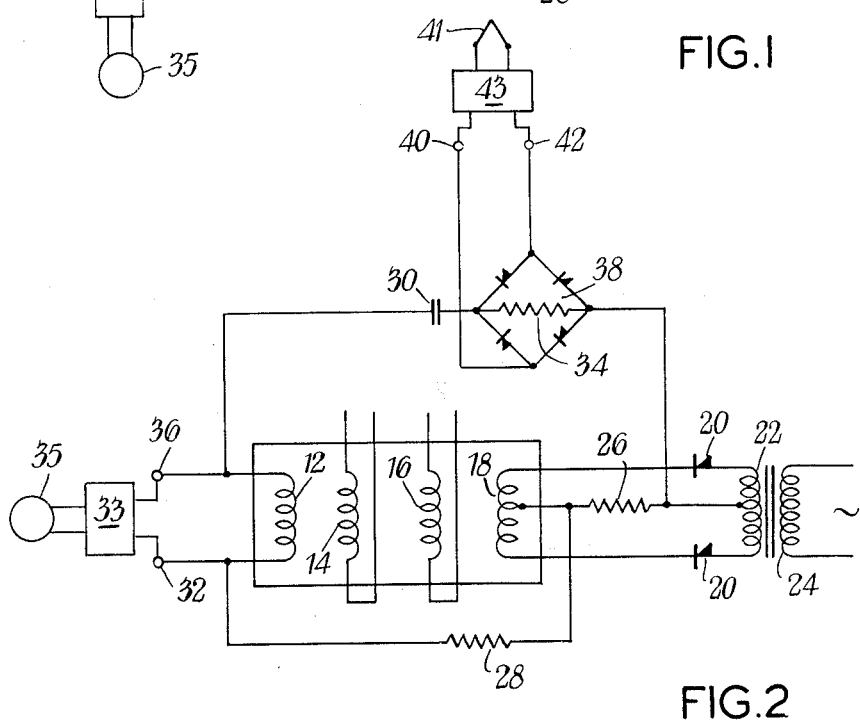

3,213,288
MAGNETIC AMPLIFIER ENGINE CONTROL SYSTEM
Benjamin Edward Blackaby, Chalfont St. Peter, England, assignor to The De Havilland Aircraft Company Limited, Hatfield, England, a company of Great Britain
Filed Aug. 21, 1961, Ser. No. 132,968
Claims priority, application Great Britain, Aug. 25, 1960, 29,455/60
19 Claims. (Cl. 307—75)

This invention relates to improvements in direct current electrical amplifier circuits.

In some applications it is desirable to be able to modify the output of a direct current electrical amplifier circuit by a direct-current signal which may be unrelated to the input to or the output of the amplifier circuit. One such application is in an engine control system where the input to the amplifier is a direct current which is a function of one engine condition, for example, engine speed, e.g. compressor speed in a gas turbine, and it is desired to modify the amplifier output as a function of a further direct current which is a function of the magnitude of a physical quantity, which may be another engine condition, e.g. engine temperature.

According to the present invention, a direct current electrical amplifier circuit has an input side, an impedance connected to said input side and means for modifying the effect of said impedance as a function of an electric signal.

According to one embodiment of the invention a direct current amplifier circuit has a resistor connected in series with the input to the amplifier circuit and a full-wave rectifier bridge circuit having said resistor connected across one diagonal thereof and arranged to have applied across the other diagonal thereof a signal for modifying the output of the amplifier circuit.

According to another embodiment of the invention, a direct current amplifier circuit has a feed-back loop connected between the output of the amplifier and the input thereof or of a stage preceding the amplifier circuit, a resistor connected in the feed-back loop and a full-wave rectifier bridge circuit having said resistor connected across one diagonal thereof and arranged to have applied across the other diagonal thereof a signal for modifying the output of the amplifier circuit.

The invention extends to an engine control system embodying an amplifier circuit according to either of the two immediately preceding paragraphs. With advantage, the input to the amplifier circuit is connected to means for deriving an input signal as a function of the magnitude of an engine condition, for example, engine speed, e.g. compressor speed in a gas turbine, and said other diagonal of the bridge circuit is connected to means for deriving the modifying signal as a function of the magnitude of a physical quantity which may be another engine condition, e.g. engine temperature.

Preferably, the amplifier circuit includes a magnetic amplifier in which case the input thereof may comprise any one of the control windings of such a magnetic amplifier.

Two embodiments of the invention as applied to an engine control system will now be described by way of example, reference being made to the accompanying drawings in which:

FIG. 1 is a circuit diagram illustrating one embodiment,

FIG. 2 is a circuit diagram illustrating a second embodiment of the invention.

Figure 3:
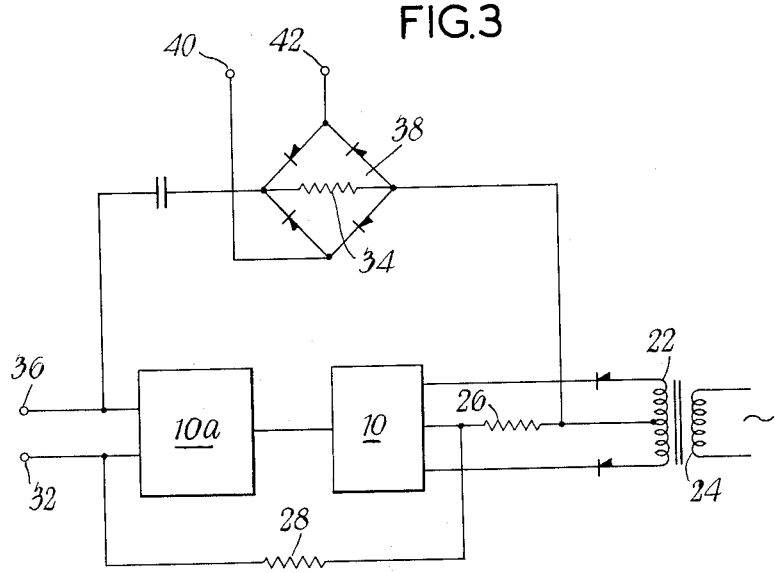
FIG. 3 is a block schematic diagram illustrating a modification of FIG. 2.

In the first embodiment illustrated in FIGURE 1 an engine control system embodies a direct current amplifier circuit comprising a magnetic amplifier 10 having control windings 12 and 14, a bias winding 16 and A.C. input windings 18 connected through rectifiers 20 across a centre-tapped secondary winding 22 of a transformer, the primary winding 24 of which is supplied with alternating current. The output of the amplifier 10 is derived across a resistor 26, one side of which is connected through a resistor 28 to one side of the control winding 12 and the other side of which is connected through a capacitor 30 to the other side of the control winding 12 to provide a derivative feed-back for the amplifier circuit. The control winding 12 is connected on one side to an input terminal 32 and on the other side through a resistor 34 to another input terminal 36, the resistor 34 forming one diagonal of a rectifier bridge circuit 38 the other diagonal of which is connected across terminals 40 and 42.

The terminals 32 and 36 are, in this example, intended for connection to means for deriving a direct-current input signal which is a function of engine speed and are shown connected through rectifying means 33 to a tachogenerator 35 driven by the compressor of a gas turbine engine. The terminals 40 and 42 are connected to means, including a thermo-couple 41 and amplifier 43, for deriving a direct-current modifying signal as a function of engine temperature.

In the operation of the circuit described the direct-current input to the amplifier 10 across the terminals 32 and 36 is a function of engine speed and the output of the amplifier 10 derived across the resistor 26 is also a function of engine speed modified as a function of engine temperature by the direct-current signal applied across the terminals 40 and 42, the effect of which is to modify the input impedance to the amplifier circuit. The output across the resistor 26 is utilised to control the fuel supply to the engine as a function of both engine speed and engine temperature.

Since the polarity of the rectifiers of the bridge circuit 38 is such that they are biased towards the non-conducting condition by the direct-current input to the terminals 32 and 36, thus, if no direct-current modulating signal is supplied to the terminals 40 and 42, then current flows from the terminals 32 and 36 to the control winding 12, only via the resistor 34. Suppose, however, that a direct-current modulating signal is supplied to the terminals 40 and 42: current from the amplifier 43 will therefore flow between the terminals 40 and 42, via one diagonally opposite pair of the rectifiers of the bridge circuit 38, and into a load comprising the resistor 34 connected in parallel with the control winding 12 and the circuit connected between the terminals 32 and 36; since one diagonally opposite pair of the rectifiers of the bridge circuit 38 will therefore be in a conducting condition, the resistor 34 will therefore be effectively shunted by the output circuit of the amplifier 43 which is connected to the terminals 40 and 42, so that, from the point of view of the terminals 32 and 36, a shunt circuit is provided in parallel with the resistor 34 and will act to modify the current supplied from the terminals 32 and 36 to the control winding 12. In summary, when a direct-current modulating signal is applied to the terminals 40 and 42, it will not only cause current to flow through the control winding 12 but will also provide a shunt circuit in parallel with the resistor 34 and thereby change the current supplied to the control winding 12 from the terminals 32 and 36.

The circuit illustrated in FIG. 2 is intended to operate in a similar manner to that described with reference to FIG. 1 and like reference numerals are used to indicate like parts. In this case, however, the resistor 34 is connected in series with the capacitor 30 in the feed-back loop and again forms one diagonal of the full-wave rectifier bridge circuit 38, the direct-current modifying signal applied to the terminals 40 and 42 serving to modify the impedance of the derivative feed-back loop.

The circuit of FIGURE 2 operates similarly to that of FIGURE 1, but in the case of FIGURE 2 the polarity of the rectifiers of the bridge circuit 38 is such that they are biased towards the non-conducting condition by the direct-current output signal from the amplifier, developed across the resistor 26.

It will be appreciated that in the above examples similar results can be achieved by connecting the resistor 34 and bridge circuit 38 to any one of the control windings of the magnetic amplifier 10, e.g. the control winding 14.

It will also be appreciated that the feed-back connections need not necessarily be connected to a control winding of the amplifier 10 but may be connected to the input or control winding of a preceding stage where such is provided as can be shown in FIG. 3 where 10a denotes a further magnetic amplifier preceding and in series with the amplifier 10.

It is further to be understood that the invention is not limited to magnetic amplifier circuits, but is applicable to direct current electrical amplifier circuits in general, including such circuits composed of transistors.

What I claim is:

1. A direct current amplifier circuit comprising an amplifier having an input circuit, first and second unidirectional electric sources, and a modulating circuit including a resistor connected in series with said input circuit to said first electric source, and including a full-wave rectifier bridge circuit comprising a plurality of unidirectional current-conducting elements and having said resistor connected directly across one diagonal thereof such that said first electric source tends to bias said unidirectional elements towards the non-conducting condition, said second electric source being connected across the other diagonal of said bridge circuit to modify the effect of said resistor and said bridge circuit as a function of the voltage of said second electric source.

2. A direct current amplifier circuit comprising an amplifier having an input circuit and an output circuit, a feed-back connection between said input and output circuits, a first unidirectional electric source connected to said input circuit, a second unidirectional electric source, and a modulating circuit including a resistor included in said feed-back connection, and including a full-wave rectifier bridge circuit comprising a plurality of unidirectional current-conducting elements and having said resistor connected directly across one diagonal thereof such that the output of said amplifier tends to bias said unidirectional elements towards the non-conducting condition, said second electric source being connected across the other diagonal of said bridge circuit to modify the effect of said resistor and said bridge circuit as a function of the voltage of said second electric source.

3. A direct current amplifier circuit comprising a number of stages one of which has an input side and another of which has an output side, a feed-back connection between said input and output sides, a resistor included in said feed-back connection and a full-wave rectifier bridge circuit having said resistor connected directly across one diagonal thereof and arranged to have a direct-current electric signal applied across the other diagonal thereof to modify the effect of said resistor and said bridge circuit as a function of the magnitude of said electric signal.

4. A direct current amplifier circuit comprising a magnetic amplifier having a control winding, first and second unidirectional electric sources, and a modulating circuit including a resistor connected in series with said control winding to said first electric source and including a full-wave rectifier bridge circuit comprising a plurality of unidirectional current-conducting elements and having said resistor connected directly across one diagonal thereof such that said first electric source tends to bias such unidirectional elements towards the non-conducting condition, said second electric source being connected across the other diagonal of said bridge circuit to modify the effect of said resistor and said bridge circuit as a function of the voltage of said second electric source.

5. A direct current amplifier circuit comprising a magnetic amplifier having a control winding and an output resistor, a feed-back connection between said output resistor and said control winding, a further resistor included in said feed-back connection and a full-wave rectifier bridge circuit having said further resistor connected directly across one diagonal thereof and arranged to have a direct-current electric signal applied across the other diagonal thereof to modify the effect of said feed-back connection as a function of the magnitude of said electric signal.

6. A direct current amplifier circuit according to claim 5 including a capacitor connected in series with said further resistor.

7. A direct current amplifier circuit comprising a plurality of serially connected magnetic amplifiers one of which has a control winding and a succeeding one of which in the series has an output resistor, a feed-back connection between said output resistor and said control winding, a further resistor included in said feed-back connection and a full-wave rectifier bridge circuit having said further resistor connected directly across one diagonal thereof and arranged to have a direct current electric signal applied across the other diagonal thereof to modify the effect of said feed-back connection as a function of the magnitude of said electric signal.

8. An engine control system including a direct current amplifier circuit having an input side, a resistor connected in series with said input side, a full-wave rectifier bridge circuit having said resistor connected directly across one diagonal thereof, means for applying a first direct-current electric signal to said input side as a function of an engine parameter and means for applying to the other diagonal of said bridge circuit a second direct-current electric signal as a function of a further engine parameter.

9. An engine control system including a direct current amplifier circuit having an input side and an output side, a feed-back connection between said input and output sides, a resistor included in said feed-back connection, a full-wave rectifier bridge circuit having said resistor connected directly across one diagonal thereof, means for applying a first direct-current electric signal to said input side as a function of an engine parameter and means for applying to the other diagonal of said bridge circuit a second direct-current electric signal as a function of a further engine parameter.

10. An engine control system according to claim 9 including a capacitor in series with said resistor.

11. An engine control system including a magnetic amplifier having a control winding, a resistor connected in series with said control winding, a full-wave rectifier bridge circuit having said resistor connected directly across one diagonal thereof, means for applying a first direct-current electric signal to said control winding as a function of an engine parameter and means for applying to the other diagonal of said bridge circuit a second direct-current electric signal as a function of a further engine parameter.

12. An engine control system including a magnetic amplifier having a control winding and an output resistor, a feed-back connection between said output resistor and said control winding, a further resistor included in said feed-back connection, a full-wave rectifier bridge circuit having said further resistor connected directly across one diagonal thereof and means for applying to the other diagonal of said bridge circuit a direct-current electric signal as a function of an engine parameter.

13. An engine control system according to claim 12 wherein said feed-back connection is a derivative feed-back connection and includes a capacitor connected in series with said further resistor.

14. An engine control system according to claim 12 including means for applying a further direct-current electric signal to said control winding as a function of a second engine parameter.

15. An engine control system according to claim 12 including a second control winding on said magnetic amplifier and means for applying a further electric signal to said second control winding as a function of a second engine parameter.

16. An engine control system including a plurality of serially connected magnetic amplifiers one of which has a control winding and a succeeding one of which in the series has an output resistor, a feed-back connection between said output resistor and said control winding, a further resistor included in said feed-back connection, a full-wave rectifier bridge circuit having said further resistor connected directly across one diagonal thereof and means for applying to the other diagonal of said bridge circuit a direct-current electric signal as a function of an engine parameter.

17. An engine control system including a direct current amplifier circuit having an input side, a resistor connected to said input side and a full-wave bridge rectifier having said resistor connected directly across one diagonal of said bridge, means for applying a first direct-current electric signal to said input side as a function of an engine parameter and means for applying to the other diagonal of said bridge a second direct-current electric signal as a function of a further engine parameter.

18. A direct-current amplifier which includes a main load, a primary direct-current source, a secondary direct-current source, and a modulator circuit, said modulator circuit including a by-pass load connected in series with said main load across the terminals of said primary source, and including a first pair of unidirectional current-conducting elements connected together in series across said by-pass load to conduct electric current in one direction, and including a second pair of unidirectional current-conducting elements connected together in series across said by-pass load to conduct electric current in the same one direction, the polarity of said primary source being such as to bias each of said unidirectional elements towards a non-conductive state, and said secondary source being connected between the junction of the elements of said first pair of unidirectional elements and the junction of the elements of said second pair of unidirectional elements, whereby the electric current caused to flow through said main load by said primary source varies as a function of the voltage of said secondary source.

19. A modulator circuit comprising a primary direct-current source, a by-pass load and a main load connected together in series across the terminals of said primary source, a first pair of unidirectional current-conducting elements connected together in series across said by-pass load to conduct electric current in one direction, a second pair of unidirectional current-conducting elements connected together in series across said by-pass load to conduct electric current in the same one direction, the polarity of said primary source being such as to bias each of said unidirectional elements towards a non-conductive state, and a secondary direct-current source connected between the junction of the elements of said first pair of unidirectional elements and the junction of the elements of said second pair of unidirectional elements, whereby the electric current caused to flow through said main load by said primary source varies as a function of the voltage of said secondary source.

References Cited by the Examiner

UNITED STATES PATENTS

| | | | |
|---|---|---|---|
| 2,523,472 | 9/50 | Leathers | 323—67 X |
| 2,662,372 | 12/53 | Offner | 60—39.28 |
| 2,675,518 | 4/54 | Morgan | 323—75 X |
| 2,728,042 | 12/55 | Ruhland | 323—75 X |
| 2,740,483 | 4/56 | Machlanski | 60—39.28 X |
| 2,841,336 | 7/58 | Martin | 60—39.28 |
| 2,944,218 | 7/60 | Newbold | 330—110 X |
| 2,959,920 | 11/60 | Brandau | 60—39.28 |
| 3,037,159 | 5/62 | Brown | 321—25 |
| 3,085,208 | 4/63 | Darling | 330—8 |
| 3,086,165 | 4/63 | Dortort | 323—89 X |

LLOYD McCOLLUM, *Primary Examiner.*

ROBERT L. SIMS, *Examiner.*